(12) United States Patent
Garcia et al.

(10) Patent No.: US 12,241,531 B1
(45) Date of Patent: Mar. 4, 2025

(54) TORQUE CONVERTER IMPELLER WITH WELD GROOVE

(71) Applicant: Schaeffler Technologies AG & Co. KG, Herzogenaurach (DE)

(72) Inventors: Ricardo Humberto Garcia, Puebla (MX); Juan Silva, San Pedro Cholula (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/376,858

(22) Filed: Oct. 5, 2023

(51) Int. Cl.
*F16H 41/28* (2006.01)

(52) U.S. Cl.
CPC ................... *F16H 41/28* (2013.01)

(58) Field of Classification Search
CPC .... F16H 41/28; B23K 26/242; B23K 20/1265
USPC ........................................................ 403/270
See application file for complete search history.

(56) References Cited

U.S. PATENT DOCUMENTS

| | | | | | |
|---|---|---|---|---|---|
| 2,177,927 | A | * | 10/1939 | Hodge | B23K 5/006 219/137 R |
| 2,790,656 | A | * | 4/1957 | Cook | B23K 9/232 428/673 |
| 2008/0251345 | A1 | * | 10/2008 | Zahner | F16H 41/28 192/112 |
| 2010/0230225 | A1 | * | 9/2010 | Yamashita | F16H 41/28 60/330 |
| 2014/0124489 | A1 | * | 5/2014 | Zhang | B23K 26/348 219/137 R |
| 2016/0131238 | A1 | | 5/2016 | McBurney et al. | |
| 2016/0290461 | A1 | * | 10/2016 | Momiyama | F16H 41/28 |
| 2020/0032887 | A1 | | 1/2020 | McBurney et al. | |

* cited by examiner

*Primary Examiner* — Aaron R Eastman

(57) ABSTRACT

An impeller for a torque converter includes a rounded blade supporting portion, an inner radial portion, and an impeller hub. The inner radial portion includes an inner radial end disposed radially inwardly of the rounded blade supporting portion and an outer surface extending from the rounded blade supporting portion to the inner radial end. The impeller hub is fixed to the outer surface of the inner radial portion via a weld. The outer surface includes a groove arranged to, at least partially, axially overlap the impeller hub. The weld is formed, at least partially, in the groove.

6 Claims, 4 Drawing Sheets

TORQUE CONVERTER IMPELLER WITH WELD GROOVE

TECHNICAL FIELD

The present disclosure relates generally to torque converters and more specifically to torque converters having an impeller shell with a weld groove.

BACKGROUND

Torque converter assemblies are well known. Torque converter assemblies generally include a front cover and a pump cover enclosing internal components, such as a lock-up clutch. Connection between the various components of a torque converter assembly can be complicated and require significant labor costs and assembly time. Accordingly, it would be desirable to provide an improved configuration for a torque converter assembly that provides manufacturing and assembly efficiencies while improving performance.

SUMMARY

Embodiments of this disclosure provide a torque converter including a front cover arranged to receive a torque and an impeller non-rotatably connected to the front cover. The impeller includes a rounded blade supporting portion, and inner radial portion, and an impeller hub. The inner radial portion having an inner radial end disposed radially inwardly of the rounded blade supporting portion and an outer surface extending from the rounded blade supporting portion to the inner radial end. The impeller hub being fixed to the outer surface of the inner radial portion via a weld. The outer surface includes a groove arranged to, at least partially, axially overlap the impeller hub. The weld is formed, at least partially, in the groove.

In embodiments, the groove may be disposed closer to the inner radial end than to the rounded blade supporting portion. In embodiments, the impeller hub may include an axial end contacting the outer surface of the inner radial portion and facing the groove. The weld may be formed to secure the axial end to the outer surface in the groove.

In embodiments, the impeller hub may include a radially inner surface and a radially outer surface disposed radially outside of the radially inner surface. The groove may be disposed radially outside of the radially inner surface. The radially inner surface may be axially aligned with the inner radial end. The groove may include two ends radially spaced from each other. One of the ends may be disposed radially between the radially inner surface and the radially outer surface. The other of the ends may be disposed radially outside of the radially outer surface.

In embodiments, the groove may be formed via stamping.

Embodiments of this disclosure further provide an assembly including a first component and a second component. The first component includes a first end and a first surface extending axially from the first end. The second component includes a second end and a second surface extending axially from the second end. The second end is fixed to the first surface via a weld. The first surface includes a groove arranged to, at least partially, axially overlap the second end. The weld is formed, at least partially, in the groove In embodiments, the second component may extend orthogonally from the first component. In embodiments, the weld may be formed to secure the second end to the first surface in the groove.

In embodiments, the second component may include a third surface disposed radially inside of the second surface. The groove may be disposed radially outside of the third surface. The third may be axially aligned with the first end. The groove may include two ends radially spaced from each other. One of the ends may be disposed radially between the second surface and the third surface. The other of the ends may be disposed radially outside of the second surface.

In embodiments, the groove may be formed via stamping.

Embodiments of this disclosure further provide a method for making an impeller of a torque converter. The method includes providing an impeller shell having a rounded blade supporting portion and an inner radial portion extending radially inwardly from the rounded blade supporting portion to an inner radial end thereof. The method further includes stamping a groove into an outer surface of the inner radial portion. The method further includes providing an impeller hub. The method further includes positioning the impeller hub to abut the outer surface and at least partially axially overlap the groove. The method further includes joining the outer surface to the impeller hub by welding to form a weld therebetween. The weld is disposed, at least partially, in the groove.

In embodiments, the groove may be disposed closer to the inner radial end than to the rounded blade supporting portion. In embodiments, the impeller hub may include an axial end contacting the outer surface of the inner radial portion and facing the groove. The weld may join the axial end to the outer surface in the groove.

In embodiments, the method may further include positioning the impeller hub such that a radially inner surface of the impeller hub is axially aligned with the inner radial end of the inner radial portion.

Embodiments disclosed herein provide the advantageous benefit of reduced costs and complexity of manufacturing torque converters, for example, by removing a chamfer on the impeller hub, which is typically machined to facilitate a welded connection. Furthermore, embodiments disclosed herein offer design advantages by providing a groove in the impeller shell that can permit increased weld penetration, which can reduce a heat affected zone of the welded connection between the impeller hub and the impeller shell, thereby can improve durability of the welded connection, without additional costly manufacturing operations.

DETAILED DESCRIPTION

Figure 1:
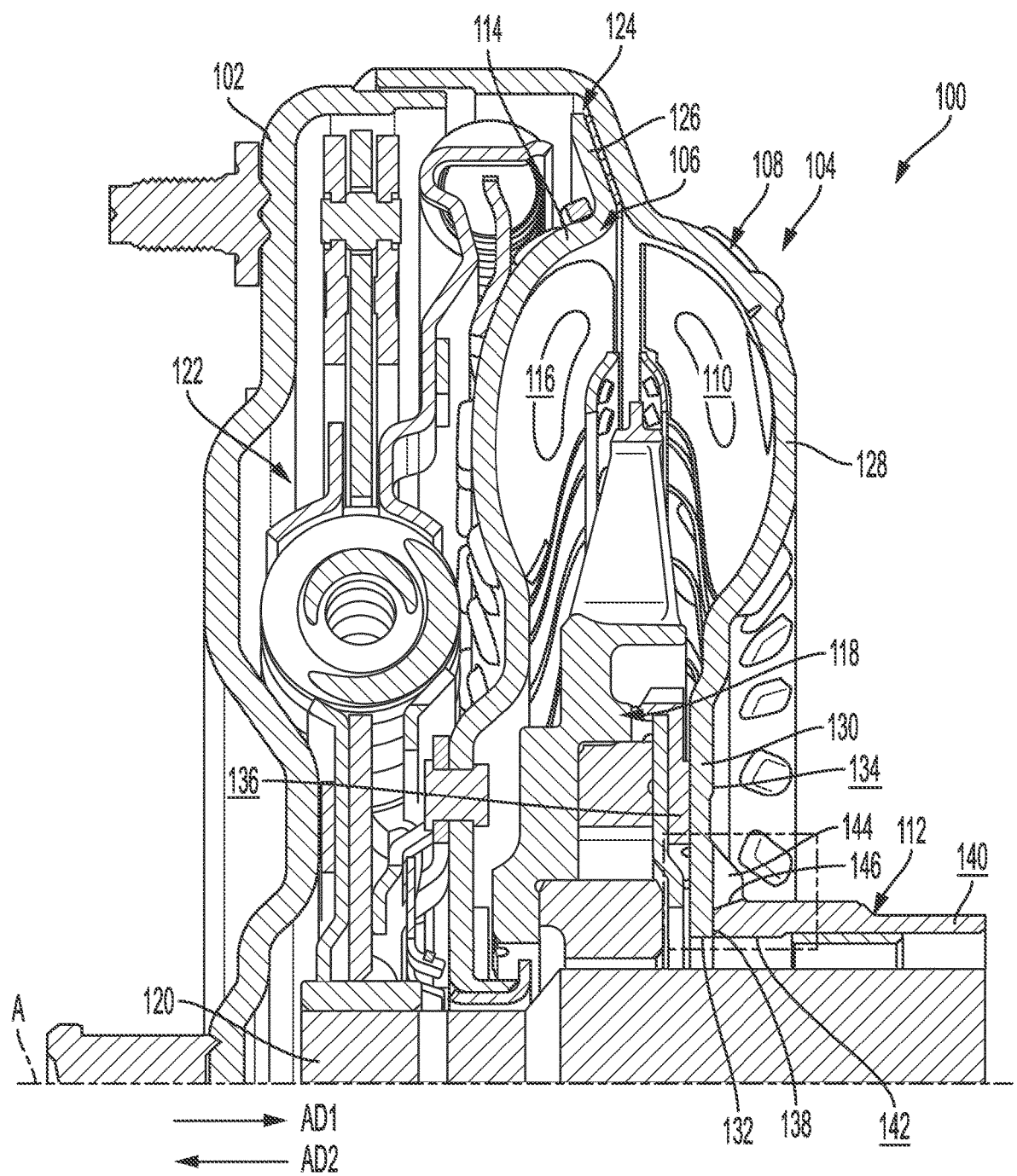
FIG. 1 illustrates a cross-sectional view of a torque converter according to the prior art.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Referring to FIGS. 1-4, a portion of a torque converter 100 is illustrated according to exemplary embodiments of the present disclosure. At least some portions of the torque converter 100 are rotatable about a central axis A. While only a portion of the torque converter 100 above the central axis A is shown in FIGS. 1-4, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller 104; and a turbine 106. The impeller 104 includes: an impeller shell 108 non-rotatably connected to the front cover 102 such that the impeller 104 rotates as the front cover 102 rotates, at least one impeller blade 110 attached to an inner surface of the impeller shell 108, and an impeller hub 112 attached to an inner radial portion 130 of the impeller shell 108 (as discussed further below). The turbine 106 includes a turbine shell 114 and at least one turbine blade 116 attached to the turbine shell 114. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The torque converter 100 may include a stator 118 disposed axially between the impeller 104 and the turbine 106 to redirect fluid flowing from the turbine blade 116 before the fluid reaches the impeller 104 to increase an efficiency of the torque converter 100. For example, the impeller blade 110, when rotated about the central axis A, pushes the fluid outwardly. The fluid pushes against the turbine 106 of the torque converter 100, causing the turbine 106 to revolve about the central axis A. The stator 118 functions to return the fluid from the turbine 106 back to the impeller 104 with minimal or no power loss. Drive power is transmitted from the turbine 106 to a transmission input shaft 120.

The torque converter 100 may include a damper assembly 122. The damper assembly 122 may be positioned axially between the front cover 102 and the impeller shell 108 and may be configured for transferring torque from the front cover 102 to the transmission input shaft 120.

Power from the vehicle engine can be transmitted to a transmission (not shown) via fluid, and via the torque converter 100. In particular, the power may be transmitted to the front cover 102. A lock-up clutch 124 is configured to selectively transfer torque from the front cover 102 to the transmission input shaft 120. The lock-up clutch 124 may be configured to drivingly engage with the damper assembly 122. For example, one of the lock-up clutch 124 and the damper assembly 122 may be arranged to receive torque from the front cover 102 and to transfer the torque from the front cover 102 to the other of the lock-up clutch 124 and the damper assembly 122.

As shown in the Figures, the lock-up clutch 124 may be formed integrally with the turbine 106. That is, the turbine shell 114 may define a piston 126 that is axially moveable in a first axial direction AD1 toward the impeller 104 and in a second axial direction AD2 away from the impeller 104 to selectively engage a portion of the impeller shell 108. In this example, the piston 126 is disposed radially outside of the turbine blade 116. As another example, the lock-up clutch 124 may be formed separately from the turbine 106. In such an example, the lock-up clutch 124 may include a reaction plate (not shown) fixed relative to the front cover 102 and a clutch pack (not shown) disposed axially between the reaction plate and the piston 126. In this situation, the piston 126 is axially moveable relative to the reaction plate to selectively compress the clutch pack against the reaction plate, i.e., selectively engage the lock-up clutch 124.

The impeller shell 108 includes a rounded blade supporting portion 128 for supporting the impeller blade 110, and the inner radial portion 130 extending radially inwardly from the rounded blade supporting portion 128. That is, the inner radial portion 130 is disposed radially inside of the impeller blade 110. The inner radial portion 130 includes an inner radial end 132 radially spaced from the rounded blade supporting portion 128. The inner radial portion 130 terminates at the inner radial end 132. The inner radial end 132 faces the central axis A.

The inner radial portion 130 further includes an outer surface 134 and an inner surface 136 each extending from the rounded blade supporting portion 128 to the inner radial end 132. The inner surface 136 faces towards the turbine shell 114, i.e., in the second axial direction AD2, and the outer surfaces 134 faces away from the turbine shell 114, i.e., in the first axial direction AD1.

The impeller hub 112 includes an axial end 138, a radially outer surface 140, and a radially inner surface 142. The axial end 138 faces the impeller shell 108 and at least a portion thereof contacts the outer surface 134 of the inner radial portion 130. The radially outer surface 140 is arranged radially outside of the radially inner surface 142 and faces radially outwardly, i.e., away from the central axis A. The radially inner surface 142 faces radially inwardly, i.e., towards the central axis A. The radially inner surface 142 may be axially aligned with the radially inner end 132 of the inner radial portion 130.

The inner radial portion 130 is fixed to the impeller hub 112 via a weld 144. The weld 144 is formed to secure the outer surface 134 of the inner radial portion 130 to the impeller hub 112. That is, the weld 144 may be referred to as a fillet weld.

Figure 2:
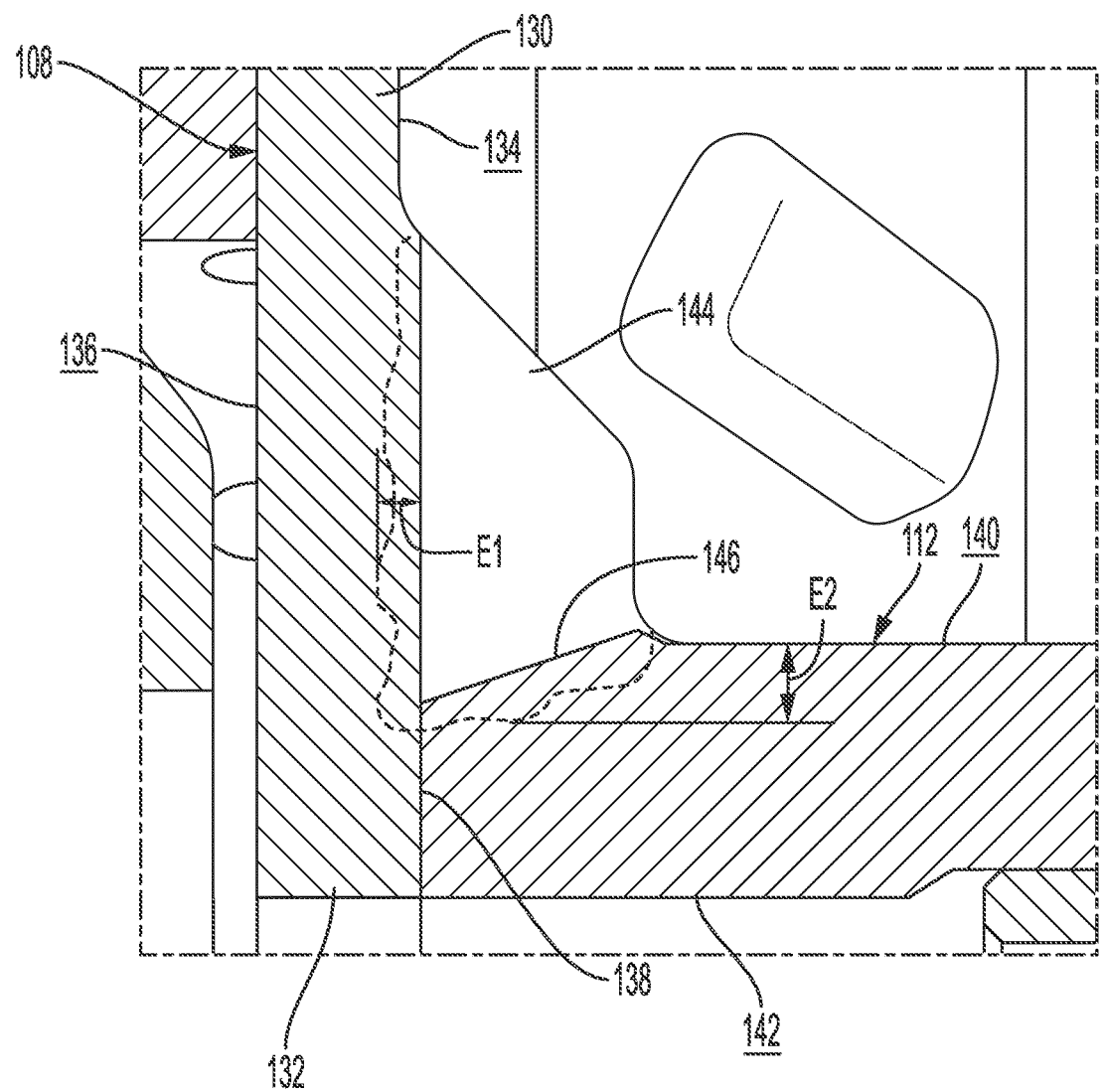
FIG. 2 illustrates a magnified view of a portion of the torque converter shown in FIG. 1.

Typically, the impeller hub 112 may further include a tapered portion 146 extending radially outwardly from the axial end 138 to the radially outer surface 140, as shown in FIGS. 1-2. In these circumstances, the weld 144 is formed to secure the outer surface 134 of the inner radial portion 130 to the tapered portion 146.

Figure 3:
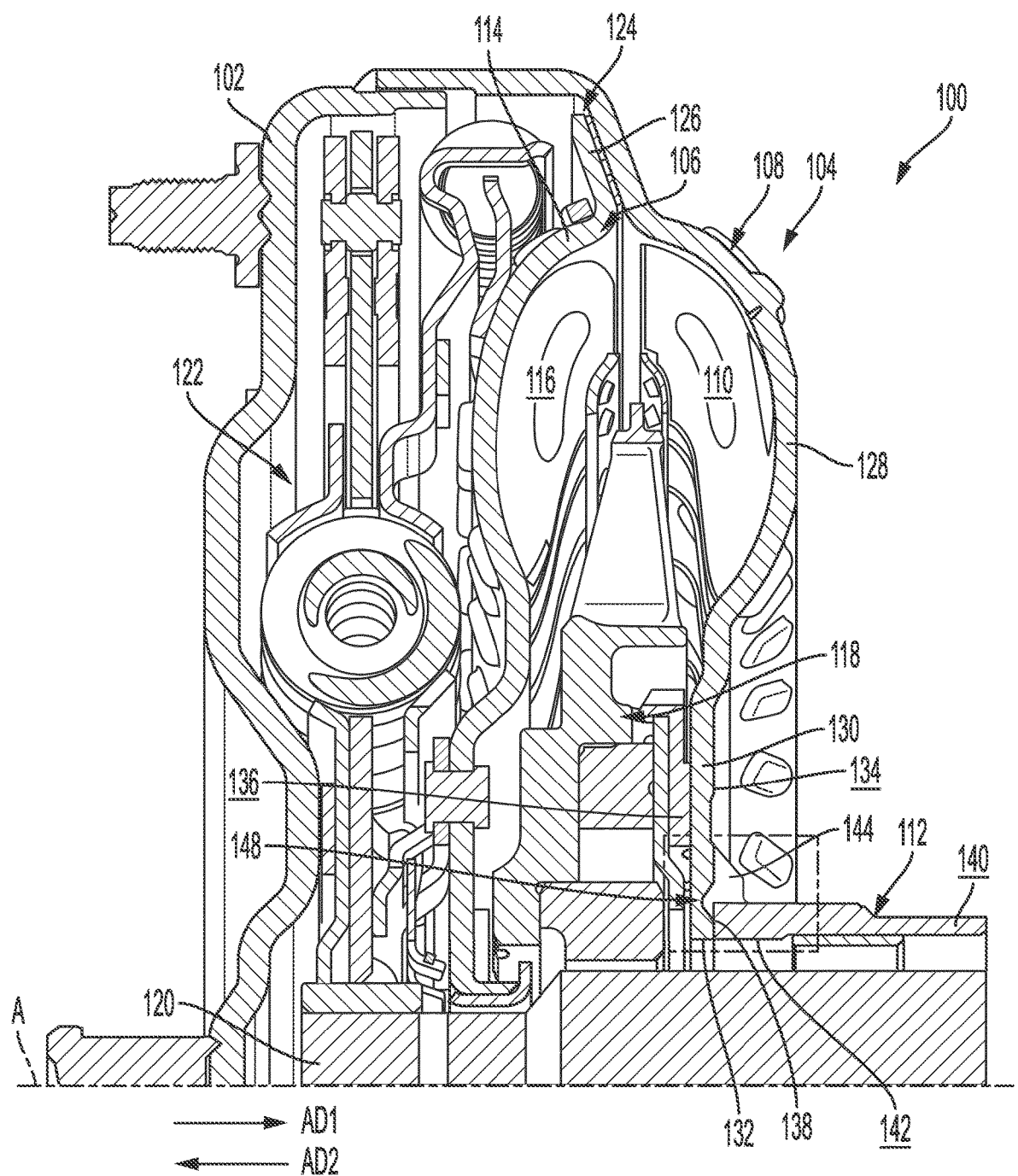
FIG. 3 illustrates a cross-sectional view of a torque converter according to one exemplary embodiment of the present disclosure.
Figure 4:
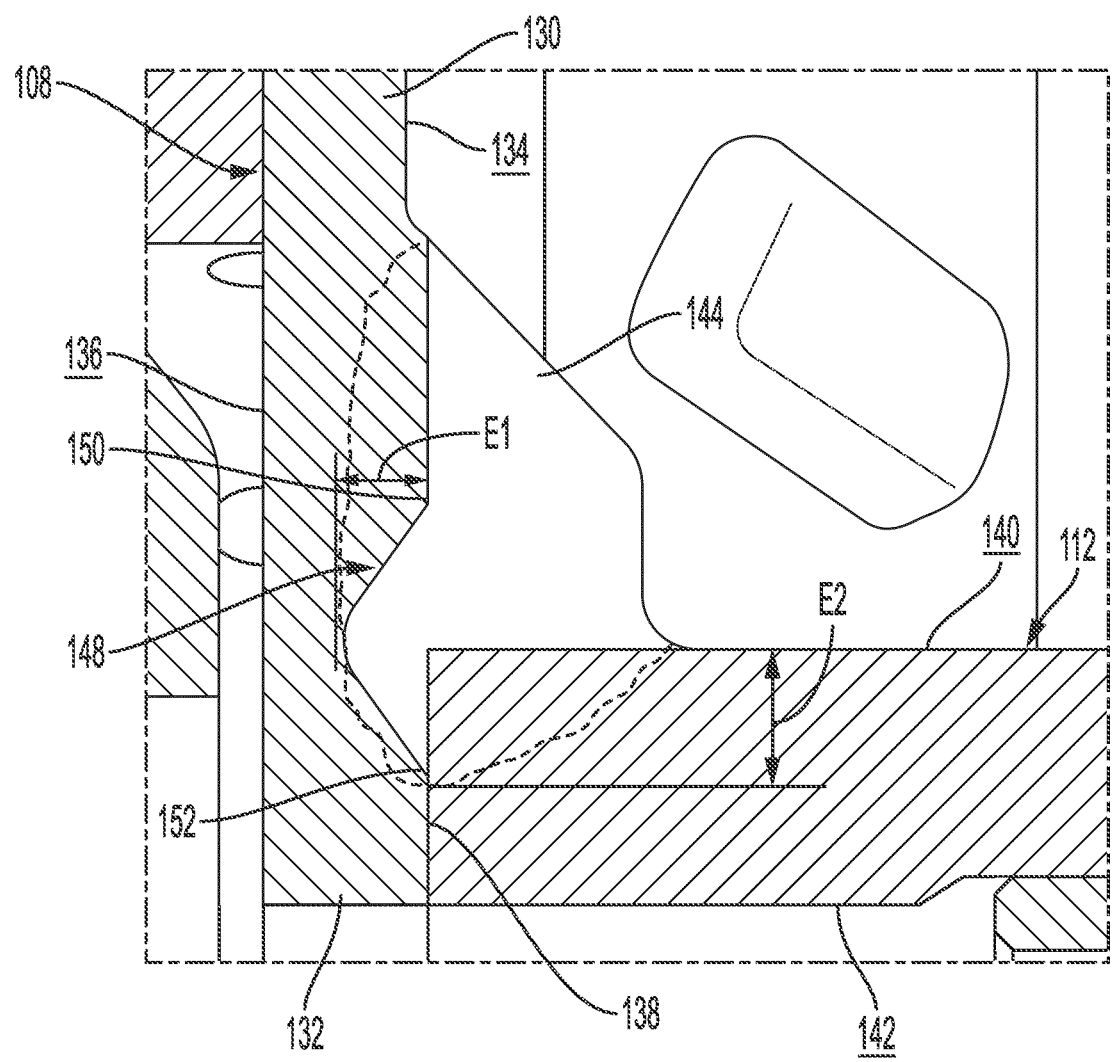
FIG. 4 illustrates a magnified view of a portion of the torque converter shown in FIG. 3.

In contrast to the prior art shown in FIGS. 1-2, the impeller hub 112, according to one exemplary embodiment of the present disclosure, lacks the tapered portion 146. Instead, the outer surface 134 includes a groove 148 extending axially towards the inner surface 136, as shown in FIGS. 3-4. The groove 148 may be stamped into the outer surface 134. That is, the groove 148 may be formed by stamping and then machined for desired finished surfaces. The groove 148 is disposed closer to the inner radial end 132 than the rounded blade supporting portion 128. The groove 148 is spaced from the inner radial end 132. Specifically, the groove 148 is arranged to, at least partially, axially overlap the impeller hub 112.

The groove 148 further includes two ends 150, 152 radially spaced from each other. One end 152 of the groove 148 is disposed radially between the radially inner surface 142 and the radially outer surface 140. That is, at least a portion of the axial end 138 contacts the outer surface 134 of the inner radial portion 130 radially inside of the groove 148. The other end 150 may be disposed radially outside of the radially outer surface 140. The weld 144 is disposed, at least partially, in the groove 148 such that the weld 144 further secures the outer surface 134 to the axial end 138 of the impeller hub 112.

The ends 150, 152 may be radially spaced from each other by any suitable amount, e.g., 6.0+/−0.5 millimeters (mm). The groove 148 may have any suitable depth, i.e., extend any suitable amount axially towards the inner surface 136, e.g., 0.9+/−0.1 mm. The groove 148 may have any suitable shape. For example, the groove 148 may be rounded, i.e., defined by an arc extending from the one end 150 to the other end 152.

The weld 144 includes a first penetration depth E1 determined from the outer surface 134 towards the inner surface 136, and a second penetration depth E2 determined from the radially outer surface 140 towards the radially inner surface 142. Providing the groove 148 may permit increased weld penetration depths E1, E2 of the weld 144 shown in FIGS. 3-4 as compared to the weld 144 shown in FIGS. 1-2. That is, the weld penetration depths E1, E2 of the weld 144 shown in FIGS. 3-4 may be greater than the respective weld penetration depths E1, E2 of the weld 144 shown in FIGS. 1-2. Further, the groove 148 may permit the employed welding technique for forming the weld 144 in FIGS. 3-4 to utilize less heat than the welding technique employed for forming the weld 144 in FIGS. 1-2. That is, the groove 148 may permit the weld 144 shown in FIGS. 3-4 to achieve the increased weld penetration depths E1, E2 while also reducing the heat affected zone of the weld 144 shown in FIGS. 3-4 as compared to the weld 144 shown in FIGS. 1-2.

To assemble the impeller 104 shown in FIGS. 3-4, the impeller shell 108 is formed to have the rounded blade supporting portion 128 and the inner radial portion 130. The groove 148 is stamped into the outer surface 134 of the inner radial portion 130. The groove 148 may be stamped in a same or subsequent process step as the forming of the impeller shell 108. The impeller hub 112 is positioned relative to the impeller shell 108 such that the axial end 138 abuts the outer surface 134 and at least partially overlaps the groove 148. The radially inner surface 142 may also be axially aligned with the inner radial end 132. The weld 144 is then formed, at least partially in the groove 148, to secure the impeller shell 108 to the impeller hub 112. Any suitable welding technique can be used to for the weld 144, e.g., laser welding techniques.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller
106 turbine
108 impeller shell
110 impeller blade
112 impeller hub
114 turbine shell
116 turbine blade
118 stator
120 transmission input shaft
122 damper assembly
124 lock-up clutch
126 piston
128 rounded blade supporting portion
130 inner radial portion
132 inner radial end
134 outer surface
136 inner surface
138 axial end
140 radially outer surface
142 radially inner surface
144 weld
146 tapered portion
148 groove
150 end
152 end
A central axis
AD1 axial direction
AD2 axial direction
E1 weld penetration depth
E2 weld penetration depth

What is claimed is:
1. A torque converter, comprising:
a front cover arranged to receive a torque;

an impeller non-rotatably connected to the front cover, the impeller including:

a rounded blade supporting portion;

an inner radial portion having an inner radial end disposed radially inwardly of the rounded blade supporting portion and an outer surface extending from the rounded blade supporting portion to the inner radial end; and an impeller hub fixed to the outer surface of the inner radial portion via a weld;

wherein the outer surface includes a groove arranged to, at least partially, axially overlap the impeller hub;

wherein the weld is formed, at least partially, in the groove;

wherein the impeller hub includes a radially inner surface and a radially outer surface disposed radially outside of the radially inner surface, the groove being disposed radially outside of the radially inner surface; and wherein the groove includes two ends radially spaced from each other, one of the ends being disposed radially between the radially inner surface and the radially outer surface.

2. The torque converter of claim 1, wherein the groove is disposed closer to the inner radial end than to the rounded blade supporting portion.

3. The torque converter of claim 1, wherein the impeller hub includes an axial end contacting the outer surface of the inner radial portion and facing the groove, the weld being formed to secure the axial end to the outer surface in the groove.

4. The torque converter of claim 1, wherein the radially inner surface is axially aligned with the inner radial end.

5. The torque converter of claim 1, wherein the other of the ends being disposed radially outside of the radially outer surface.

6. The torque converter of claim 1, wherein the groove is formed via stamping.

* * * * *